(No Model.)
J. S. BLACKBURN.
HOSE COUPLING.
No. 537,744. Patented Apr. 16, 1895.
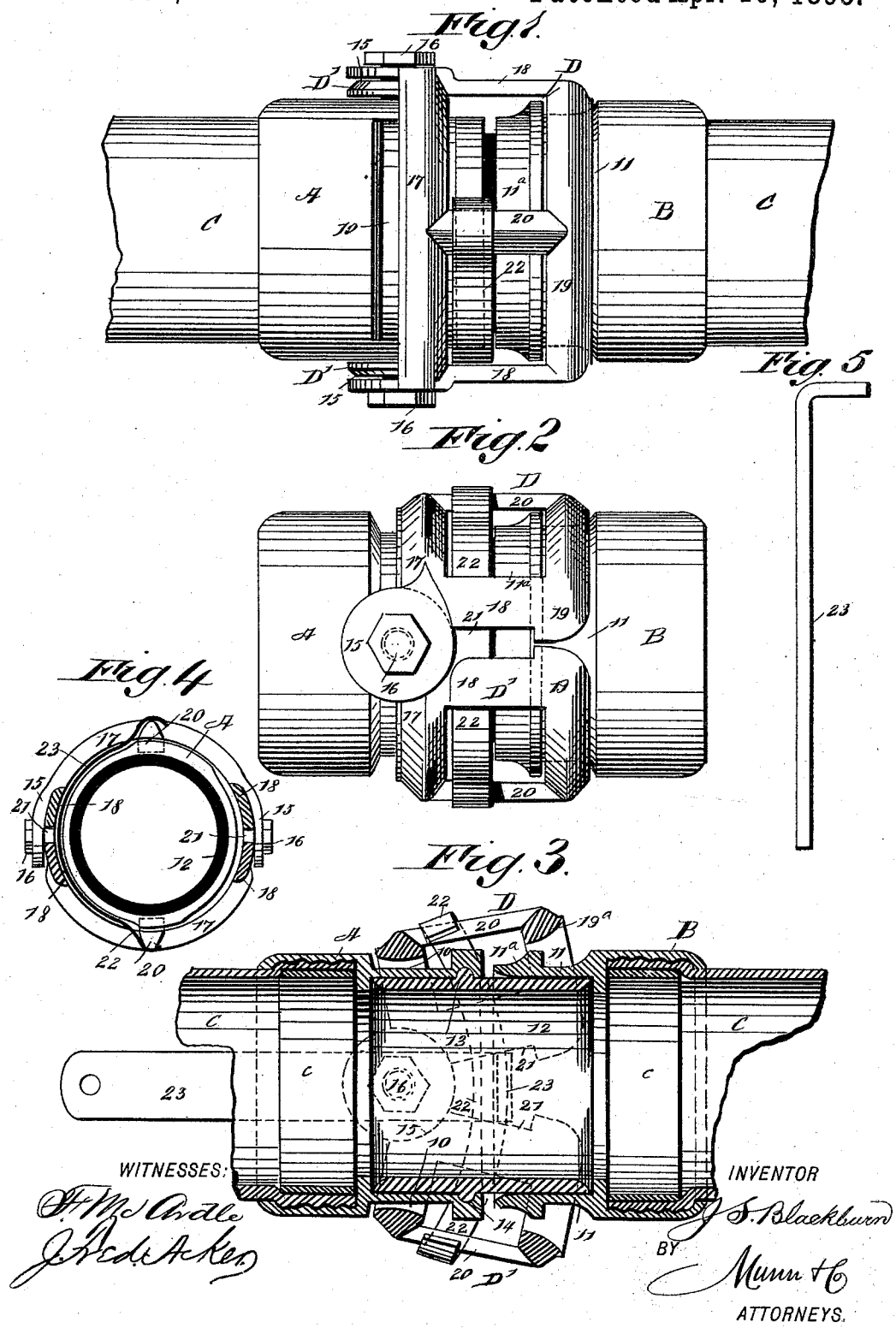
WITNESSES:
INVENTOR
J. S. Blackburn
BY
Munn & Co
ATTORNEYS.

UNITED STATES PATENT OFFICE.

JOSEPH S. BLACKBURN, OF SALEM, OHIO.

HOSE-COUPLING.

SPECIFICATION forming part of Letters Patent No. 537,744, dated April 16, 1895.

Application filed August 22, 1894. Serial No. 520,952. (No model.)

*To all whom it may concern:*

Be it known that I, JOSEPH S. BLACKBURN, of Salem, in the county of Columbiana and State of Ohio, have invented a new and Improved Hose-Coupling, of which the following is a full, clear, and exact description.

My invention relates to an improvement in hose couplings, and has primarily for its object to improve upon the construction of the coupling for which Letters Patent were granted to me January 2, 1894, No. 511,992, the improvements being such as to adapt the type of coupling therein shown to hose of large sizes, and to dispense with various features of the patented coupling, reducing the expense of the same.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the improved coupling, the male and female sections being coupled. Fig. 2 is a view similar to Fig. 1, but taken from another side of the coupling. Fig. 3 is a longitudinal vertical section through the two sections of the coupling, illustrating the locking device as freed from one of the sections, permitting an uncoupling. Fig. 4 is a diametrical section through one of the coupling sections and the locking device carried thereby; and Fig. 5 is a plan view of a wrench used in connection with the coupling.

In carrying out the invention the coupling comprises the usual male section A and female section B, and the hose C instead of being located upon the outside of the coupling sections is made to enter the said sections, and is held therein preferably through the medium of an expanded ring $c$, as shown in Fig. 3; but the attachment between the hose and the coupling sections may be effected in any other desired manner. The male section A is provided with two peripheral grooves 10, formed a predetermined distance from and preferably near the outer edge of the coupling. These grooves 10 are opposite one another, and are separated only by a space sufficiently large to receive and hold a pivot. An annular groove or exterior channel 11, is produced in the female section of the coupling near its outer edge, and the peripheral surface between the groove 11 and the outer edge of the section is more or less concave, as shown at $11^a$ in the drawings. The outer wall of the groove or channel 11 is straight, or practically so, as shown in Fig. 3.

The male section of the coupling is provided with a sleeve 12 of a waterproof material, preferably rubber, and this sleeve is made to enter the coupling section a predetermined distance, being provided with an exterior rib 13, entering a correspondingly shaped groove 14 in the interior of the coupling, and the sleeve 12 is of such length that it extends a sufficient distance beyond the outer face of the male section A to enable the sleeve to fully enter the female section of the coupling, as illustrated in Fig. 3. The water pressure against the inside surface of the section A will force the sleeve outward against the interior surface of the female section and thus make a water-tight joint without depending upon abutting the sleeve against a shoulder formed in the coupling. In this manner when the coupling sections are brought together a sure and tight water-way is obtained from one hose section to the other.

The locking device is carried by the male section of the coupling, and the said section comprises two semi-circular jaws D, D'. These jaws are located opposite one another, and are provided at the inner portion of their end surfaces with lugs 15, and the lugs of one jaw rest upon those of the other, while corresponding lugs of the jaws are pivoted upon the solid portions of the male coupling between the grooves 10 by means of pivot pins 16 of suitable construction. The jaws extend outward preferably a greater distance than the packing sleeve 12, but they may be of any desired width. The jaws are of like construction, and comprise a rear bar 17 to which the lugs 15 are secured, end bars 18, a front bar 19, and an intermediate cross bar 20. The under face of the outer or front cross bar 19 of each jaw is preferably curved or rendered convex, as shown at 19ª in Fig. 3, and the lower faces of both the front and rear bars 19 and 17 of the jaws extend downward below the plane of the end and intermediate bars 18 and 20, in order that when the jaws lie flat against the coupling sections the inner bars 17 will enter the grooves 10 of the said coupling, while the under faces of the outer bars 19 will be somewhat below the upper edge of the outer end of the coupling section. The jaws are recessed at their ends in order that when they are closed down upon the coupling section a space 21 is formed between them; and the jaws are held normally in folded position upon the coupling section usually by means of a single spring 22, which is secured to the intermediate cross bars 20 of both jaws, being provided with bent ends embracing the outer faces of the cross bars 20, and with a curved body which is made to pass beneath the adjacent end bars of both of the jaws at one side of the coupling as shown in Fig. 4.

In the operation of coupling, the two sections are brought together and the packing sleeve 12 of one section will enter the opposing section, while the opposing section will automatically lift the jaws upward and outward, as shown in Fig. 3, and the moment the jaws have ridden over the concaved surface 11ª of the opposing coupling section and the front bars 19 of the jaws have entered the groove or channel 11 of said section, as shown in Figs. 1 and 2, a complete and effective coupling will be obtained, the spring serving to hold the jaws in their locked position.

In order that the jaws may be readily opened, effecting an uncoupling, a wrench 23 is used, which is angular, comprising a long handled member and a shorter working member or foot. This working member or foot is introduced into the space 21 between the ends of the two jaws, and is turned in a manner to bring the wider portion of the jaw of the wrench in contact with opposing ends of the jaws, thus forcing the jaws apart and to the position shown in Fig. 3; whereupon the female section may be readily removed from the male section.

Having thus described my invention, I claim as new and desire to secure by Letters Patent—

1. A coupling comprising a member provided with oppositely arranged movable jaws each having a rear bar, a front bar, two end bars and an intermediate cross bar, a spring having bent ends embracing the outer sides of the cross bars and passing under the side bars at one side of the coupling, whereby the jaws are held together, and a member having a groove or channel to receive the ends of said jaws, substantially as set forth.

2. A hose coupling, one of the members of which is provided with a pair of oppositely arranged spring-actuated jaws, said member being also provided with an annular groove formed around its inner face near its mouth and having an expansible sleeve provided with a circumferential bead engaging said groove, the end of said sleeve projecting from the open end of said member beyond the ends of the said jaws the other member being adapted to receive said sleeve and hold the ends of said spring-actuated jaws, substantially as set forth.

3. In a hose coupling, the combination, with one section having grooves formed upon its periphery and opposing jaws pivoted between the grooves, the inner sides of the jaws being located over the grooves, whereby the jaws may be opened outward in opposite directions, the inner sides of the jaws extending beyond the said section and below the plane of their connecting members, the said jaws being provided at their opposing ends with recesses adapted to receive a wrench, and a spring normally holding the said jaws in contact, of a sleeve of water-proof material entered in the said section, and adapted to enter the opposing section, and a second or opposing section adapted to receive the projecting end of the sleeve and provided with a peripheral groove or channel fitted to receive the outer members of the said jaws, as and for the purpose set forth.

JOSEPH S. BLACKBURN.

Witnesses:
FRANK. F. TRIMBLE,
WALTER F. SCHWARTZ.